(12) United States Patent
Ogawa (10) Patent No.: US 11,524,599 B2
(45) Date of Patent: Dec. 13, 2022

(54) CONTROL APPARATUS, POWER CONTROL SYSTEM, CONTROL METHOD, AND STORAGE MEDIUM HAVING PROGRAM STORED THEREON

(71) Applicant: HONDA MOTOR CO., LTD., Tokyo (JP)

(72) Inventor: Makoto Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 16/815,516

(22) Filed: Mar. 11, 2020

(65) Prior Publication Data

US 2020/0298720 A1 Sep. 24, 2020

(30) Foreign Application Priority Data

Mar. 18, 2019 (JP) .............................. JP2019-050206

(51) Int. Cl.
  *B60L 53/60* (2019.01)
  *G05F 1/67* (2006.01)
  *G06Q 30/02* (2012.01)
(52) U.S. Cl.
  CPC ............... *B60L 53/60* (2019.02); *G05F 1/67* (2013.01); *G06Q 30/0236* (2013.01); *B60L 2260/54* (2013.01)
(58) Field of Classification Search
  CPC ......... B60L 53/60; B60L 2260/54; G05F 1/67
  (Continued)

(56) References Cited

U.S. PATENT DOCUMENTS

2010/0076825 A1 3/2010 Sato et al.
2013/0257351 A1* 10/2013 Nishibayashi ............ H02J 7/34
  320/107

(Continued)

FOREIGN PATENT DOCUMENTS

CN 106960279 7/2017
JP 6242006 11/2017
JP 2017-221041 12/2017

OTHER PUBLICATIONS

European Search Report dated Jun. 3, 2020, 11 pages.
(Continued)

*Primary Examiner* — Md Azad
(74) *Attorney, Agent, or Firm* — Rankin, Hill & Clark LLP (57) ABSTRACT

A control apparatus comprises: a first acquisition unit configured to acquire information indicating charging and discharging performance of an electric power device and environmental information on the electric power device; a second acquisition unit configured to acquire information indicating a characteristic of operation of charging and discharging the electric power device; a correction unit configured to correct the information indicating the charging and discharging performance of the electric power device on the basis of the environmental information; and a control unit configured to control the operation of charging and discharging the electric power device according to a management plan, the management plan being based on the information indicating the charging and discharging performance corrected by the correction unit and the information indicating the characteristic of the operation of charging and discharging the electric power device.

12 Claims, 8 Drawing Sheets

(58) Field of Classification Search
USPC .......................................................... 700/297
See application file for complete search history.

(56) References Cited

U.S. PATENT DOCUMENTS

| | | |
|---|---|---|
| 2014/0225570 A1 | 8/2014 | Suga et al. |
| 2014/0361745 A1 | 12/2014 | Nishita et al. |
| 2015/0145483 A1* | 5/2015 | Shinohara ............. H02J 7/0071 320/134 |
| 2015/0165918 A1* | 6/2015 | Shizuno .................... H02J 3/28 320/109 |
| 2018/0006335 A1 | 1/2018 | Fujita et al. |
| 2018/0261893 A1* | 9/2018 | Fujita ..................... H02J 7/0021 |
| 2021/0075226 A1* | 3/2021 | Kogo ..................... G06Q 50/06 |

OTHER PUBLICATIONS

Optimal scheduling of virtual power plant with battery degradation cost, Bin Zhou et al., IET Generation, Transmission & Distribution, IET, UK, vol. 10, No. 3, Feb. 18, 2016 (Feb. 18, 2016), pp. 712-725, XP006055643, ISSN: 1751-8687, DOI: 10.1049/IET-GTD.2015.0103.

Intelligent battery energy management and control for vehicle-to-grid via cloud computing network, Hamid Khayyam et al., Applied Energy, Elsevier Science Publishers, GB, vol. 111, Jul. 19, 2013 (Jul. 19, 2013), pp. 971-981, XP028703124, ISSN: 0306-2619, DOI: 10.1016/J. APENERGY.2013.06.021 pp. 1-6.

Primary Frequency Regulation with Li-ion Battery Energy Storage System: a Case Study for Denmark, Maciej Swierczynski et al., 2013 IEEE ECCE Asia Downunder, IEEE, Jun. 3, 2013 (Jun. 2, 2013), pp. 487-492, XP032475489, DOI: 10.1109/ECCE-ASIA.2013.6579141 ISBN: 978-1-1799-0483-9, pp. 487-491.

* cited by examiner

| APPARATUS IDENTIFICATION INFORMATION 1101 | VEHICLE IDENTIFICATION INFORMATION 1102 | CONNECTION PLAN 1103 |
|---|---|---|
| A10 | d100 | 9:00 – 22:30 |
| B10 | c113 | 12:00 – 22:30 |
| C10 | – | – |
| D10 | h724 | 0:00 – 6:00 |

CONTROL APPARATUS, POWER CONTROL SYSTEM, CONTROL METHOD, AND STORAGE MEDIUM HAVING PROGRAM STORED THEREON

CROSS-REFERENCE TO RELATED APPLICATION(S)

This application claims priority to and the benefit of Japanese Patent Application No. 2019-050206 filed on Mar. 18, 2019, the entire disclosure of which is incorporated herein by reference.

BACKGROUND OF THE INVENTION

Field of the Invention

The present invention relates to a control apparatus, a power control system, a control method, and a storage medium having a program stored thereon that allow controlling an electric power device.

Description of the Related Art

Resource aggregators have recently become known that aggregate power sources (resources) of customers residing across a region in order to satisfy requests regarding demand for power in an electric power market. A mechanism for a resource aggregator to control demand for power is known as demand response (DR), in which customers can participate to earn a reward from the aggregator. The aggregator controls resources owned by the customers, for example a charger, to start or stop operation. Japanese Patent No. 6242006 describes a charger for electric vehicles that enables an in-vehicle battery of an electric vehicle to be charged with power generated by a solar power generator.

The aggregator can obtain information on the specifications of each resource of consumers under an agreement such as a contract, and carries out a resource management plan based on the information obtained. However, due to various causes, such as deterioration over time and temperature changes, the aggregator may not be able to achieve performance as expected by the management plan, resulting in a divergence between the management plan and the performance.

SUMMARY OF THE INVENTION

The present invention provides a control apparatus, a power control system, a control method, and a storage medium having a program stored thereon that allow reducing the difference between a management plan for an electric power device and the performance of the electric power device.

The present invention in its first aspect provides a control apparatus that controls an electric power device managed in a VPP system, the control apparatus comprising: a first acquisition unit configured to acquire information indicating charging and discharging performance of the electric power device and environmental information on the electric power device; a second acquisition unit configured to acquire information indicating a characteristic of operation of charging and discharging the electric power device; a correction unit configured to correct the information indicating the charging and discharging performance of the electric power device on the basis of the environmental information; and a control unit configured to control the operation of charging and discharging the electric power device according to a management plan, the management plan being based on the information indicating the charging and discharging performance corrected by the correction unit and the information indicating the characteristic of the operation of charging and discharging the electric power device.

The present invention in its second aspect provides a power control system comprising: a control apparatus that controls an electric power device managed in a VPP system; and an external apparatus capable of communicating with the control apparatus, the control apparatus comprising: a first acquisition unit configured to acquire information indicating charging and discharging performance of the electric power device and environmental information on the electric power device; a second acquisition unit configured to acquire information indicating a characteristic of operation of charging and discharging the electric power device; a correction unit configured to correct the information indicating the charging and discharging performance of the electric power device on the basis of the environmental information; and a first transmission unit configured to transmit, to the external apparatus, the information indicating the charging and discharging performance corrected by the correction unit and the information indicating the characteristic of the operation of charging and discharging the electric power device, the external apparatus comprising a second transmission unit configured to transmit an instruction for operation of charging and discharging the electric power device according to a management plan, the management plan being based on the information indicating the corrected charging and discharging performance and the information indicating the characteristic of the operation of charging and discharging the electric power device transmitted by the first transmission unit, the control apparatus further comprising a control unit configured to control the operation of charging and discharging the electric power device according to the instruction transmitted by the second transmission unit.

The present invention in its third aspect provides a control method performed in a control apparatus that controls an electric power device managed in a VPP system, the method comprising: acquiring information indicating charging and discharging performance of the electric power device and environmental information on the electric power device; acquiring information indicating a characteristic of operation of charging and discharging the electric power device; correcting the information indicating the charging and discharging performance of the electric power device on the basis of the environmental information; and controlling the operation of charging and discharging the electric power device according to a management plan, the management plan being based on the information indicating the corrected charging and discharging performance and the information indicating the characteristic of the operation of charging and discharging the electric power device.

The present invention in its fourth aspect provides a non-transitory computer-readable storage medium having a program stored thereon, the program causing a computer to: acquire information indicating charging and discharging performance of an electric power device managed in a VPP system and environmental information on the electric power device; acquire information indicating a characteristic of operation of charging and discharging the electric power device; correct the information indicating the charging and discharging performance of the electric power device on the basis of the environmental information; and control the operation of charging and discharging the electric power device according to a management plan, the management plan being based on the information indicating the corrected charging and discharging performance and the information indicating the characteristic of the operation of charging and discharging the electric power device.

According to the present invention, the difference between a management plan for an electric power device and the performance of the electric power device can be reduced.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
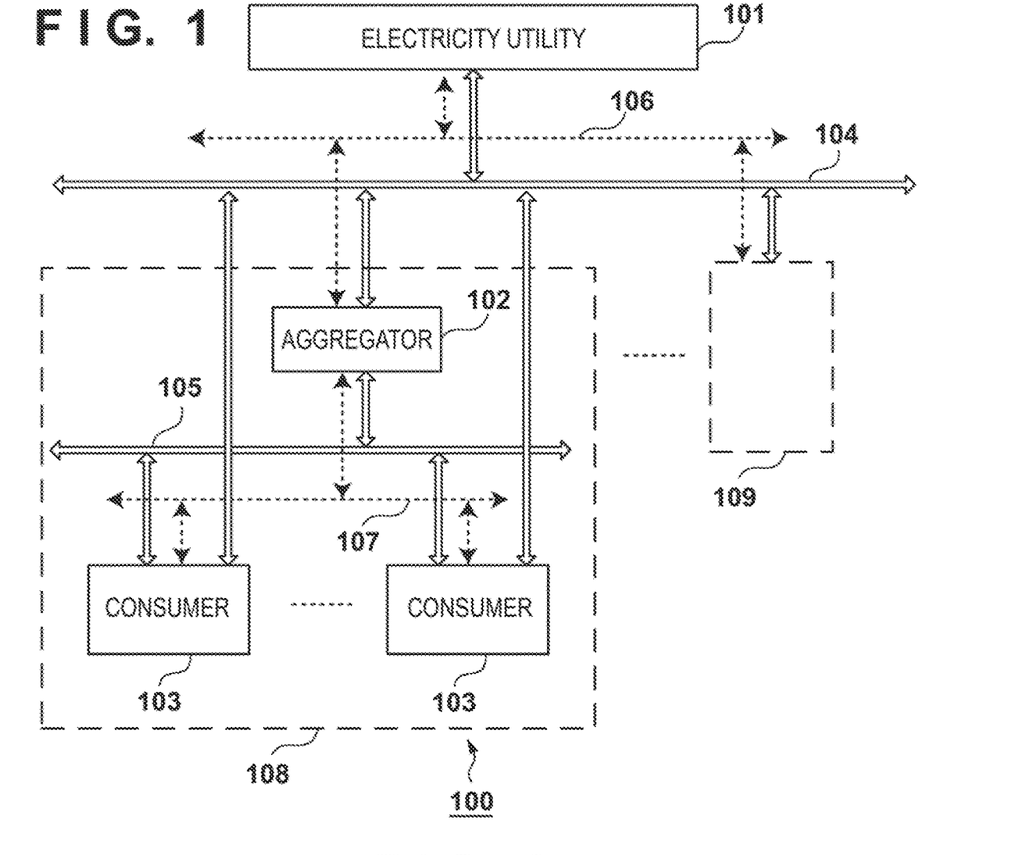
FIG. 1 is a diagram showing a general configuration of a VPP system.

FIG. 1 is a diagram showing a general configuration of a VPP (Virtual Power Plant) system 100 in this embodiment. As shown in FIG. 1, the VPP system 100 in this embodiment is a power control system that includes an electricity utility 101, an aggregator 102, and consumers (or customers) 103. The electricity utility 101 is, for example, an electricity retailer or an electricity transmission and distribution utility that supplies power to the consumers 103, which are homes and commercial facilities, through an electricity transmission network 104. The consumers 103 represent facilities themselves, such as homes, factories, and buildings.

The aggregator 102 intermediates between the consumers 103 and the electricity utility 101 and provides a VPP service to the consumers 103. In the VPP service, for example, power generation systems and power storage systems owned by the consumers 103 are managed for satisfying a request from the electricity utility 101. The aggregator 102 constructs the VPP by integrating and controlling, over an EMS network 105, energy management systems of the consumers 103 in a certain region. If a consumer 103 is a home facility, the energy management system of the consumer 103 is a system that manages electric energy for use at home (HEMS: Home Energy Management System). If a consumer 103 is a commercial facility, the energy management system of the consumer 103 is a system that manages electric energy for use in the facility (BEMS: Building Energy Management System). The aggregator 102 can integrate and control the energy management systems of the consumers 103 using, for example, IoT (Internet of Things) data on the consumers 103.

The aggregator 102 is configured to include a server. In this embodiment, the aggregator 102 will be described as a server. The aggregator 102 manages information on the consumers 103 and information on resources in the energy management systems of the consumers 103. The aggregator 102 can send and receive data to and from the consumers 103 over a communication network 107 shown as dotted lines, and to and from the electricity utility 101 over a communication network 106 shown as dotted lines. The communication networks 106 and 107 here may be either wired or wireless, or a combination thereof. For example, the Internet may be used as the communication network 106.

Each of areas 108 and 109 in FIG. 1 represents an area in which the aggregator 102 provides the VPP service. The area 109 includes another set of an aggregator 102 and consumers 103, as in the area 108.

Figure 2:
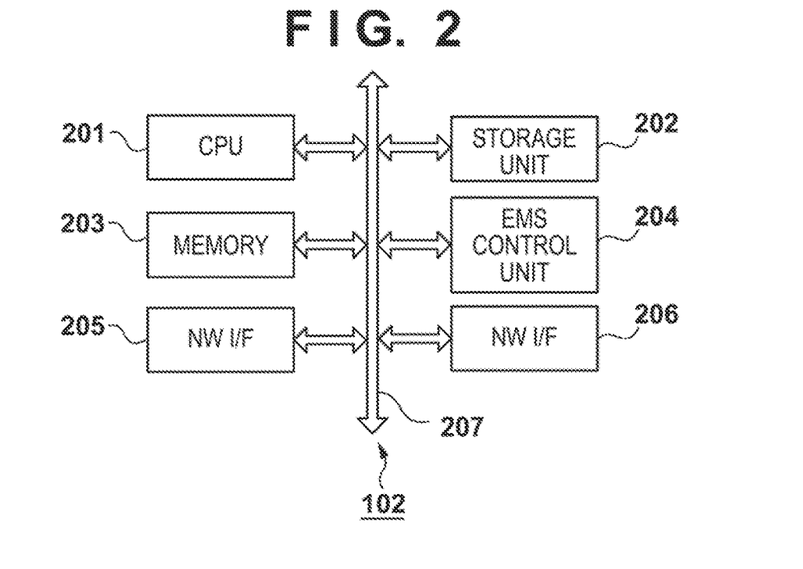
FIG. 2 is a diagram showing a configuration of an aggregator.

FIG. 2 is a diagram showing a configuration of the aggregator 102. The configuration in FIG. 2 may be embodied as a computer capable of executing programs associated with the present invention. The blocks shown in FIG. 2 are communicatively interconnected via a system bus 207. A CPU 201 centrally controls the aggregator 102 by, for example, reading programs stored in a storage unit 202 into a memory 203 and executing the programs. The storage unit 202 stores basic programs and data for the aggregator 102 to operate, as well as parameters and data necessary for an EMS control unit 204 to control the operation of each resource of the consumers 103. The storage unit 202 also stores consumer information and resource information, for example, as information used in this embodiment. The storage unit 202 also stores a marketing program that provides functions of trading in an electric power market.

The consumer information is information on each consumer, for example information acquired from the content of a contract made between the consumer and the manager of the aggregator 102 when the consumer desires to use the VPP service. The VPP service allows each consumer to earn a reward for resource management by the aggregator 102, and includes negawatt trading and posiwatt trading, for example. The consumer can participate in such trading by making a contract with the aggregator 102. After making the contract, the consumer receives an instruction from the aggregator 102 for controlling the demand for power, so that target resources in the energy management system are remotely controlled by the aggregator 102 over the EMS network 105. The consumer earns a reward as compensation for the management of the resources in the energy management system of the consumer 103 by the aggregator 102. Here, the demand for power is controlled in order to, for example, reduce or increase the demand relative to the amount of power supplied by the electricity utility 101, or stabilize the frequency in an electric power system.

The content of the contract made by the consumer with the manager of the aggregator 102 includes, for example, the VPP service type, the region name, the selected power type, and the payment destination of the reward/the way of paying the reward. The content of the contract also includes consumer-specific information, for example address information, residence information, the family structure, and contact information. The content of the contract also includes, for example, the range of increase and decrease in the demand for power addressable by the consumer 103. The content of the contract also includes information on what kinds of electric power devices the consumer owns. If the consumer 103 is a home consumer, the electric power devices owned by the consumer include, for example, an air conditioner, an illumination device, a home electric appliance, a power generation system such as a solar panel, and a power storage system such as an in-vehicle battery of an electric vehicle (EV).

The resource information is information on the resources in the energy management system of the consumer 103. The resources here are the above-described electric power devices and systems. The resource information includes information on the specifications of each electric power device, for example the device type, the model number, the start-up time, the stabilization time, the amount of generated power, the standby power, the energy efficiency, maintenance information, the failure history, the operation history, the date of purchase, and the operable duration. The resource information also includes information on the environmental load of each resource, for example the amount of $CO_2$ (carbon dioxide) emission, noise sound, the amount of vibration, and emission (electric noise). As with the consumer information, the resource information is acquired when, for example, the consumer makes the contract with the manager of the aggregator 102.

In FIG. 2, the consumer information and the resource information are registered in a database constructed in the storage unit 202 of the aggregator 102. Alternatively, the consumer information and the resource information may be registered in a database constructed in an external server, which may be accessed by the CPU 201 to acquire the information as appropriate.

The EMS control unit 204 controls each resource in the energy management system of the consumer 103 over the EMS network 105. For example, in response to a request to reduce the demand for power from the electricity utility 101, the EMS control unit 204 causes a storage battery connected to a solar power generator to be discharged. A network interface (NW I/F) 205 is an interface for enabling communication over the EMS network 105. A network interface (NW I/F) 206 is an interface for enabling communication over the networks 107 and 106 and is configured to include, for example, an NIC (Network Interface Card).

The aggregator 102 has functions for providing the VPP service. For example, from information such as the electricity use state of each resource in the energy management system of the consumer 103, the aggregator 102 analyzes the time period for which the resource is used and also predicts variation in the demand for power in the area managed by the aggregator 102. The aggregator 102 optimizes the operation of each resource in the energy management system of the consumer 103 so that a request regarding the demand for power from the electricity utility 101 is satisfied (an operation plan), and makes an assessment for setting the reward to be paid to the consumer. These functions are performed by the CPU 201, for example.

Figure 3:
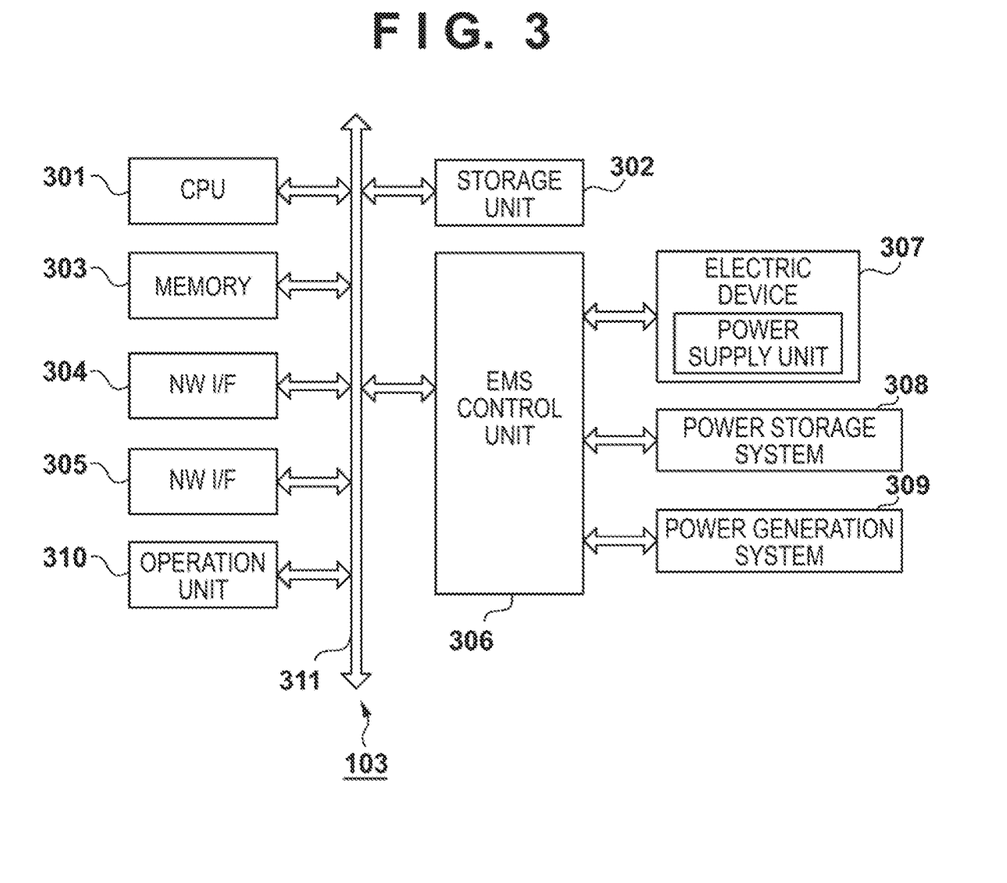
FIG. 3 is a diagram showing a configuration of a consumer.

FIG. 3 is a diagram showing a configuration of each consumer 103. The blocks shown in FIG. 3 are communicatively interconnected via a system bus 311. The configuration shown in FIG. 3 may be embodied as, for example, the power control system of the HEMS of the consumer 103 that is a home consumer. A CPU 301 centrally controls the consumer 103 by, for example, reading programs stored in a storage unit 302 into a memory 303 and executing the programs. The storage unit 302 stores basic programs and data for the consumer 103 to operate, as well as parameters and data necessary for an EMS control unit 306 to control the operation of each resource.

A network interface (NW I/F) 304 is an interface for enabling communication over the EMS network 105. A network interface (NW I/F) 305 is an interface for enabling communication over the network 107 and is configured to include, for example, an NIC.

The EMS control unit 306 controls the operation of each resource in the energy management system of the consumer 103. In this embodiment, the EMS control unit 306 activates or deactivates each resource in response to receiving a control instruction from the EMS control unit 204 of the aggregator 102. An electric device 307, a power storage system 308, and a power generation system 309 are resources whose operation is controlled by the EMS control unit 306. The electric device 307 is an illumination device or a home electric appliance, for example. The power storage system 308 includes, for example, an in-vehicle cell (battery) or a storage battery of an electric vehicle or a fuel cell vehicle. The power generation system 309 is a solar power generator, for example. The EMS control unit 306 can, for example, control the power storage system 308 to be charged and discharged and control the power generation system 309 to be discharged, thereby increasing the self-sufficiency rate in the consumer 103. By way of example, the EMS control unit 306 will be described in this embodiment as a charging and discharging apparatus connected to an EV. The charging and discharging apparatus includes an AC/DC converter serving as an interface unit to an electric power system, a DC/DC converter serving as an interface unit to the EV, and a path control unit that controls a discharging path and a charging path for the EV.

An operation unit 310 is a device with which the manager of the consumer 103 can input various types of information. For example, the operation unit 310 includes a touch panel that receives, from the manager, the connection time for which the vehicle is connected to the charging and discharging apparatus.

The configuration in FIG. 3 may be embodied as multiple apparatuses. For example, the configuration may be embodied as two apparatuses: a server apparatus that includes the CPU 301, the storage unit 302, the memory 303, the NW I/F 304, the NW I/F 305, and the operation unit 310; and an apparatus that includes the EMS control unit 306.

Figure 4:
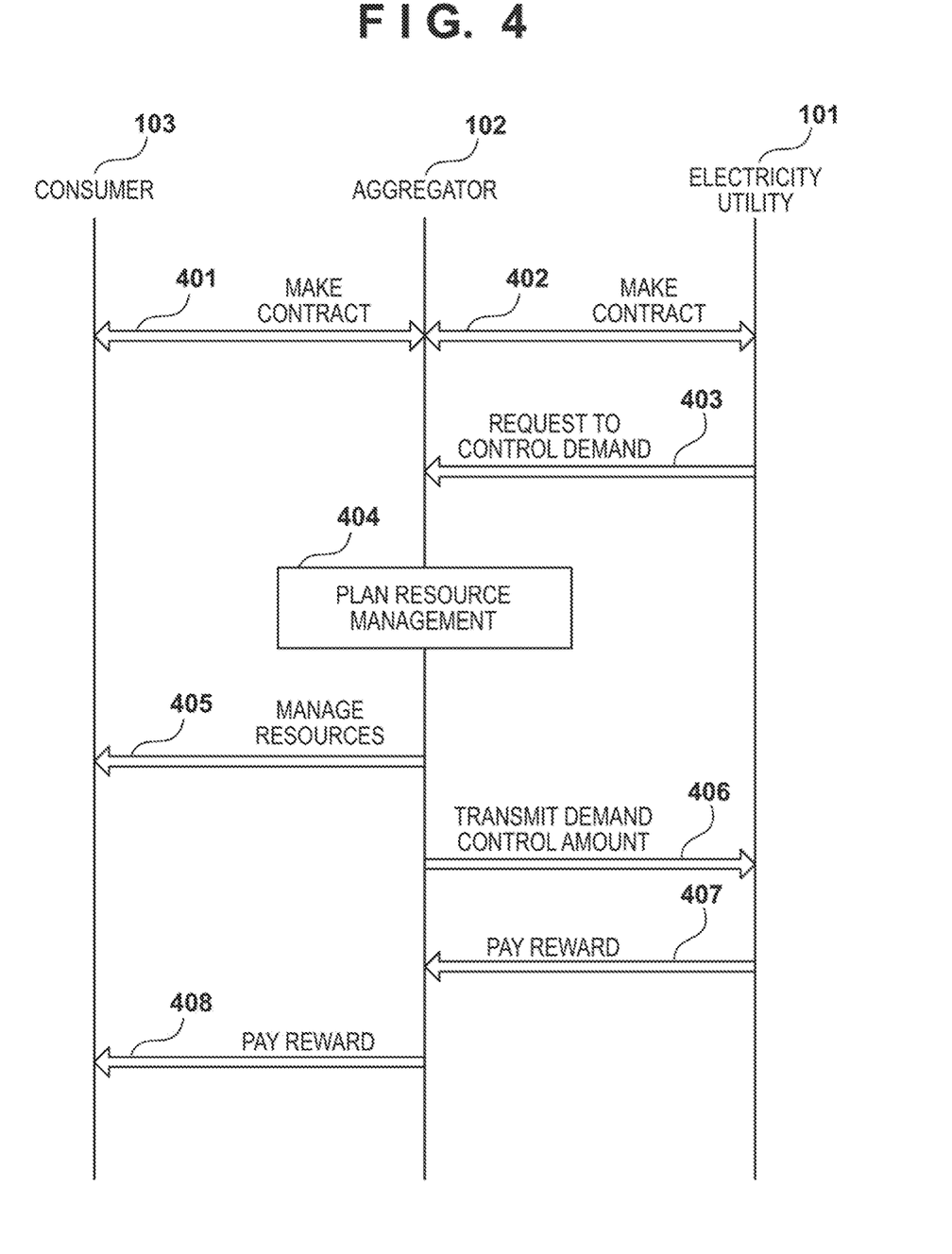
FIG. 4 is a sequence diagram showing a process among the aggregator, the consumer, and an electricity utility.

FIG. 4 is a sequence diagram showing an exemplary process performed in the VPP system 100 among the aggregator 102, each consumer 103, and the electricity utility 101. First, in step 401, a contract for using the VPP service is made between the consumer 103 and the aggregator 102. In step 402, a contract for performing the VPP service is made between the aggregator 102 and the electricity utility 101.

Thereafter, if the aggregator 102 receives a request to control the demand for power from the electricity utility 101 in step 403, the aggregator 102 plans the management of the resources in the energy management system of the consumer 103 in step 404. Here, the request to control the demand for power from the electricity utility 101 is, for example, a request to reduce or increase the demand for power. Step 404 may be performed before step 403 or may be performed periodically irrespective of the timing of step 403. In step 405, the aggregator 102 manages the resources in the energy management system of the consumer 103 according to the management plan. In step 406, the aggregator 102 transmits the performance of the control of the demand for power to the electricity utility 101. In step 407, the electricity utility 101 pays a reward depending on the performance to the aggregator 102. In step 408, the aggregator 102 pays a reward (an incentive) to the consumer 103.

A process in which the consumer 103 transmits information to be used for the management plan to the aggregator 102 in this embodiment will be described below. In the following, an electric vehicle (EV) will be described as an example of the resources to be managed, i.e., electric power devices, and a charging and discharging apparatus to which the EV is connected will be described as an example of the EMS control unit 306. The charging and discharging apparatus can operate to charge and discharge an in-vehicle cell (battery) in the EV.

As described above, the aggregator 102 can acquire specification information on the electric power device as the resource information, and use the specification information to plan the resource management. However, the electric power device may not be able to achieve performance as expected by the specifications due to causes such as the use environment and the age. In addition, the charging and discharging apparatus that controls the electric power device has its unique characteristics, such as a reduction in efficiency depending on the power load. Due to such causes, a divergence may arise between the management plan and the management performance. In this embodiment, the consumer 103 transmits information on such causes to the aggregator 102 in response to a request from the aggregator 102. The aggregator 102 can then use the information for the management plan to prevent a widening of the difference between the management plan and the management performance.

Figure 5:
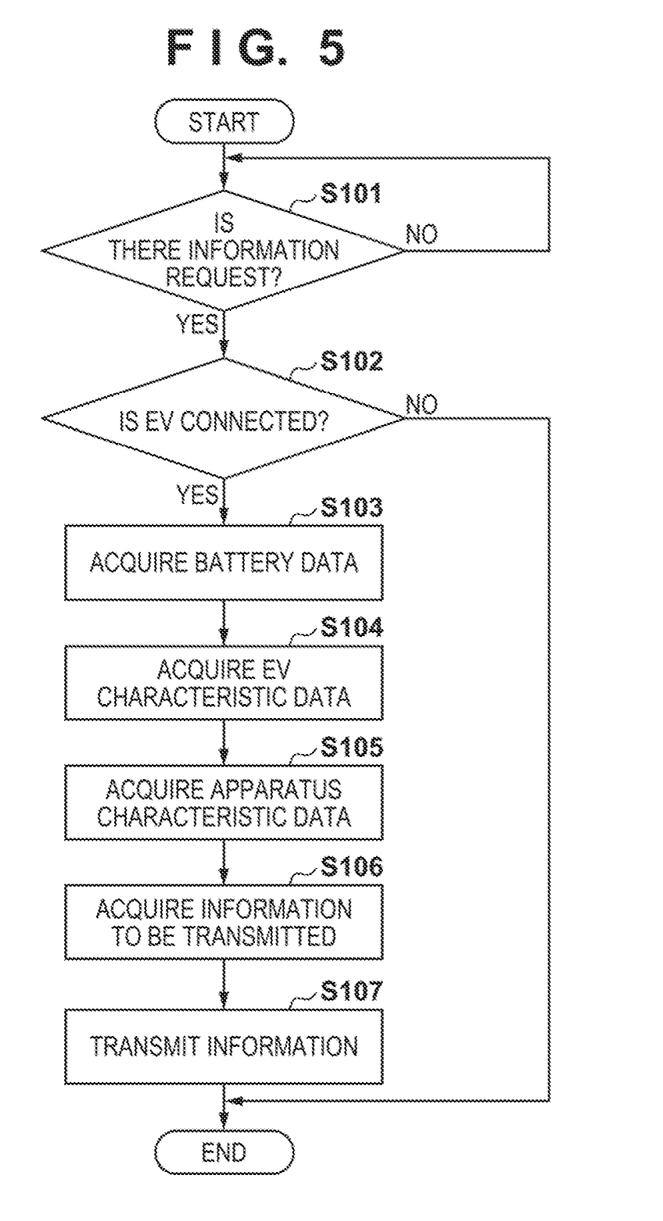
FIG. 5 is a flowchart showing a process of transmitting information from the consumer to the aggregator.

FIG. 5 is a flowchart showing the process of transmitting the information from the consumer 103 to the aggregator 102 in this embodiment. The process in FIG. 5 is implemented by, for example, the CPU 301 loading a program stored in the storage unit 302 into the memory 303 and executing the program. The process in FIG. 5 is performed periodically, for example at 17:00 every day.

In S101, the CPU 301 determines whether a request to acquire information on the battery of the EV is received from the aggregator 102. If the CPU 301 determines that a request to acquire battery information is received, the process proceeds to S102. If the CPU 301 determines that no request to acquire battery information is received, the processing in S101 is repeated. Here, the request to acquire battery information may be a request for resource information to be used for the resource management plan, for example a request for information on the specifications of the battery.

In S102, the CPU 301 determines whether the EV is connected to the charging and discharging apparatus. If the CPU 301 determines that the EV is connected to the charging and discharging apparatus, the process proceeds to S103. If the CPU 301 determines that the EV is not connected to the charging and discharging apparatus, the process in FIG. 5 terminates. For example, if the consumer 103 is a commercial facility, where multiple charging and discharging apparatuses possibly exist, the process may proceed to S103 if the EV is connected to at least one of the charging and discharging apparatuses.

In S103, the CPU 301 acquires, from the charging and discharging apparatus, battery data on the EV connected to the charging and discharging apparatus. The battery data here is specification-based data on the battery of the EV, including, for example, the total battery capacity, the remaining battery capacity, and the chargeable and dischargeable capacity. The chargeable and dischargeable capacity is a capacity corresponding to the difference between the upper-limit of charging and the lower-limit of discharging. The battery data may be acquired by the charging and discharging apparatus communicating with the EV, or may be stored in the charging and discharging apparatus in advance. The battery data may also be acquired from information on the contract made with the aggregator 102 in step 401 in FIG. 4.

The battery data on the battery of the EV being used by the consumer 103 is used for making a management plan for the resources in the energy management system of the consumer 103. However, due to causes such as environmental causes, including deterioration of the battery over time and the temperature, mismatches of the battery data occur between the specification information and actual values. Consequently, even if the consumer 103 carries out the EV connection plan according to the contract, a divergence arises between the management plan and the management performance.

In this embodiment, the battery data that is the specification information is corrected on the basis of environmental information such as the temperature, and the corrected battery data is transmitted to the aggregator 102, as will be described below. Information on the charging and discharging efficiency of the charging and discharging apparatus according to the corrected battery data is also transmitted to the aggregator 102. The aggregator 102 can therefore carry out the resource management plan reflecting the characteristics of the EV and the characteristics of the charging and discharging apparatus, thereby reducing the divergence between the management plan and the management performance.

In S104, the CPU 301 acquires EV characteristic data. The EV characteristic data here is data on the battery of the EV but is different from the specification-based battery data. The EV characteristic data is battery data indicating the environment and the use state of the EV connected to the charging and discharging apparatus, including, for example, the ambient temperature of the battery, the number of years in operation, and deterioration characteristics of the battery.

Figure 8A:
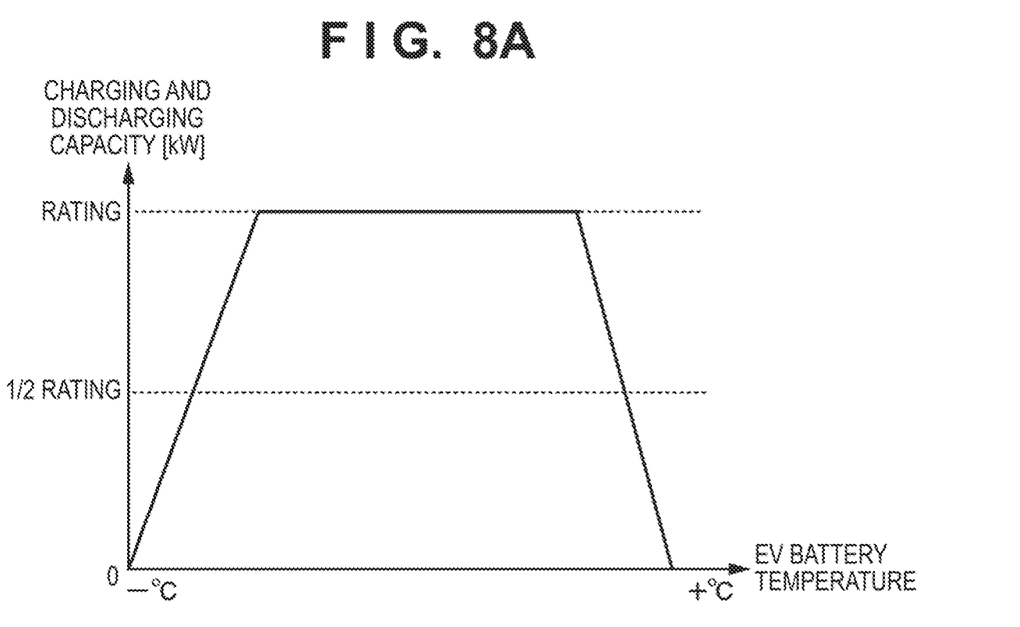
FIGS. 8A and 8B are diagrams showing EV characteristic data.
Figure 8B:
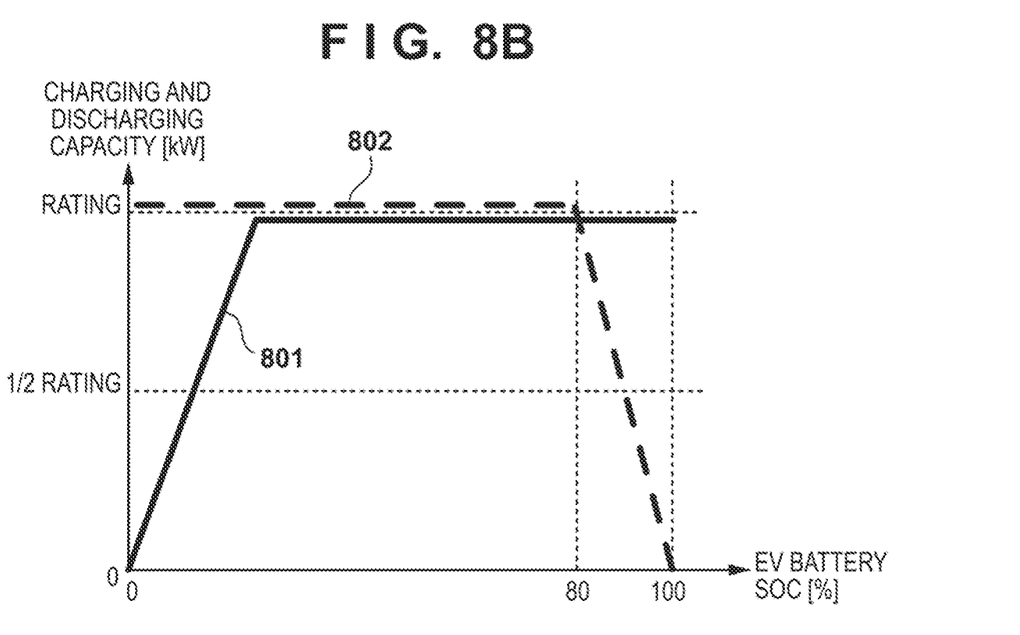

FIGS. 8A and 8B are diagrams showing examples of the EV characteristic data acquired in S104. FIG. 8A shows a battery temperature characteristic as an exemplary characteristic in the EV characteristic data. The ordinate indicates the charging and discharging capacity, and the abscissa indicates the ambient temperature of the battery of the EV connected to the charging and discharging apparatus. FIG. 8A indicates that the charging and discharging capacity is smaller at extremely low ambient temperatures of the battery. That is, if the ambient temperature of the battery is extremely low, the internal resistance of the battery increases to cause the chargeable and dischargeable capacity to decrease. Therefore, the charging and discharging capacity is reduced. FIG. 8A also indicates that the charging and discharging capacity is smaller at extremely high ambient temperatures of the battery. That is, if the battery is charged or discharged at a high battery ambient temperature, the temperature further rises to cause the battery to deteriorate. Therefore, the charging and discharging capacity is reduced.

FIG. 8B shows battery temperature characteristics at the completion of charging or discharging, as exemplary characteristics in the EV characteristic data. The ordinate indicates the charging and discharging capacity, and the abscissa indicates the SOC (State Of Charge) of the battery. The SOC is an indication of the charging and discharging performance expressed in "remaining capacity/full-charge capacity," and the battery is charged and discharged within the range of SOCs specified by the manufacturer. A graph 802 in FIG. 8B indicates that the charging and discharging capacity is smaller at the completion of charging, i.e., when the SOC approaches the maximum. That is, the charging and discharging capacity is reduced for preventing deterioration of the battery due to overcharge. A graph 801 indicates that the charging and discharging capacity is smaller at the completion of discharging, i.e., when the SOC approaches the minimum. That is, the charging and discharging capacity is reduced for preventing deterioration of the battery due to over-discharge. Although the graphs 801 and 802 in FIG. 8B do not overlap in the portion corresponding to the rating, this is for ease of illustration and not intended to represent the relationship of variations between the two graphs.

The EV characteristic data in FIGS. 8A and 8B is not limited to the form of a graph but may be represented as a function for each temperature band or as discrete values. While FIGS. 8A and 8B show the rating, the value of the rating is appropriately determined on the basis of the specifications of the battery and the specifications of the surrounding environment.

Figure 9:
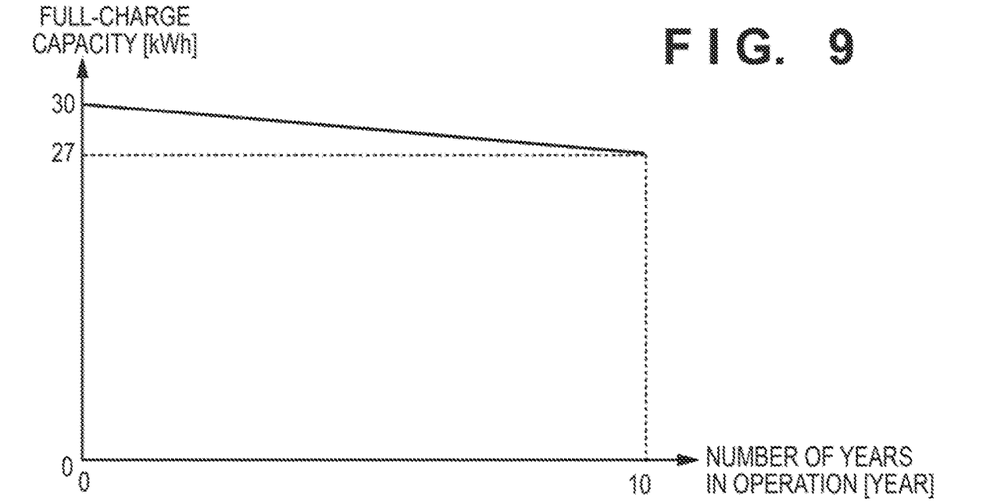
FIG. 9 is a diagram showing EV characteristic data.

FIG. 9 is a diagram showing another example of the EV characteristic data acquired in S104. As exemplary EV characteristic data, FIG. 9 shows the characteristic of the full-charge capacity with respect to the number of years the battery has been operating. As shown in FIG. 9, for example, the full-charge capacity is 30 kWh when the battery is purchased (the years in operation=0 years) but decreases to 27 kWh after the years in operation=10 years. Although the chargeable and dischargeable capacity is determined to be, for example, in the SOC range from 20% to 80% by the manufacturer, deterioration over time as shown in FIG. 9 makes it difficult to achieve the chargeable and dischargeable capacity according to the specifications. As in FIGS. 8A and 8B, the EV characteristic in FIG. 9 is not limited to the form of a graph but may be represented as a function or discrete values.

The characteristic data as shown in FIGS. 8A, 8B and 9 may be acquired by the charging and discharging apparatus communicating with the EV, or may be stored in the charging and discharging apparatus in advance.

In S105, the CPU 301 acquires apparatus characteristic data. The apparatus characteristic data here is, for example, characteristic data unique to the charging and discharging apparatus to which the EV is connected.

Figure 10:
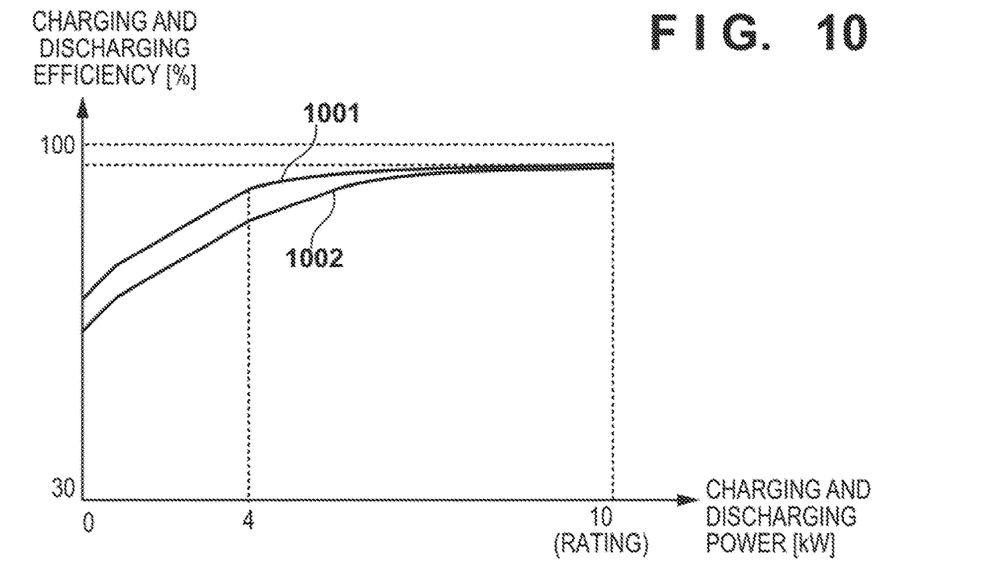
FIG. 10 is a diagram showing apparatus characteristic data.

FIG. 10 is a diagram showing an example of the apparatus characteristic data acquired in S105. As exemplary apparatus characteristic data, FIG. 10 shows efficiency characteristics with respect to the power load. FIG. 10 indicates that, for a power load rating of 10 kW, the charging and discharging efficiency of the charging and discharging apparatus decreases as the power load decreases. A graph 1001 in FIG. 10 indicates the efficiency characteristic in the operation of charging the battery (AC/DC conversion mode), and a graph 1002 indicates the efficiency characteristic in the operation of discharging the battery (DC/AC conversion mode). Thus, in S105, the CPU 301 acquires the apparatus characteristic data for each of the operations of battery charging and battery discharging. As in FIGS. 8A, 8B and 9, the apparatus characteristic data in FIG. 10 is not limited to the form of a graph but may be represented as functions or discrete values. The characteristic data as shown in FIG. 10 may be stored in the charging and discharging apparatus in advance.

Figure 11:
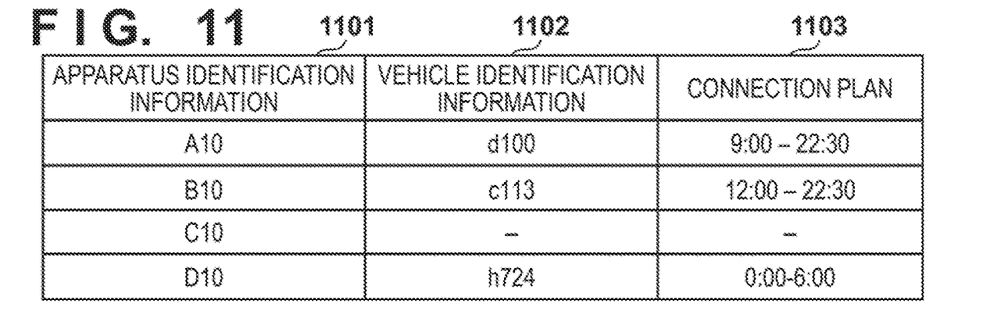
FIG. 11 is a diagram showing apparatus characteristic data.

FIG. 11 is a diagram showing another example of the apparatus characteristic data acquired in S105. As exemplary apparatus characteristic data, FIG. 11 shows a connection plan for connecting EVs to charging and discharging apparatuses. Apparatus identification information 1101 is information for identifying each charging and discharging apparatus. Vehicle identification information 1102 is information for identifying the vehicle (EV) connected to the charging and discharging apparatus. Connection plan 1103 is information indicating the plan for connecting the vehicle to the charging and discharging apparatus. For example, the connection plan 1103 indicates that the EV identified by d100 is connected to the charging and discharging apparatus identified by A10 from 9:00 to 22:30. The information shown in FIG. 11 is acquired by, for example, the manager of the consumer 103 inputting the time period for which each vehicle is connected to the corresponding charging and discharging apparatus with the operation unit 310 at a predetermined time every day.

In S106, on the basis of the battery data acquired in S103, the CPU 301 acquires information to be transmitted to the aggregator 102. The CPU 301 acquires the information to be transmitted to the aggregator 102 by correcting the specification-based battery data acquired in S103. For example, the CPU 301 corrects the chargeable and dischargeable capacity (for 40° C. according to the specifications) acquired in S103 on the basis of the number of years the battery has been operating, the ambient temperature of the battery, and the EV characteristic data in FIGS. 8A, 8B, and 9. For example, if the battery has been operating for zero years and the ambient temperature of the battery is low, the battery has not deteriorated over time but the charging and discharging capacity has decreased due to the low ambient temperature. This decrease is taken into account to correct the battery data. For example, the decrease in the charging and discharging capacity is regarded as equivalent to a decrease in the chargeable and dischargeable capacity, and the specification-based chargeable and dischargeable capacity acquired in S103 is multiplied by a factor to calculate a corrected chargeable and dischargeable capacity. If the number of years the battery has been operating is to be taken into account, for example, the chargeable and dischargeable capacity is determined from the full-charge capacity corresponding to the number of years in operation as in FIG. 9. A corrected chargeable and dischargeable capacity is then calculated on the basis of the decrease in the charging and discharging capacity due to the decreased ambient temperature.

The CPU 301 further acquires charging and discharging power on the basis of the corrected chargeable and dischargeable capacity and the connection time of the EV in which the battery resides. Here, the connection time of the EV in which the battery resides is acquired from the apparatus characteristic data in FIG. 11. For example, the CPU 301 acquires six hours from 0:00 to 6:00 as the connection time of the EV in which the battery resides. Assume that the charging and discharging power is calculated to be 4 kW, for example, on the basis of the corrected chargeable and dischargeable capacity (Wh) and the connection time of the EV described above. Then, it can be seen from the apparatus characteristic data in FIG. 10 that the charging efficiency and the discharging efficiency of the charging and discharging apparatus decrease from the rating, and that the degree of the decrease of the discharging efficiency is higher than that of the charging efficiency. While FIG. 10 shows the rating, the value of the rating is appropriately determined on the basis of the specifications of the battery and the apparatus, and the specifications of the surrounding environment.

In this manner, in S106, the CPU 301 acquires, as the information to be transmitted to the aggregator 102, the information on the corrected chargeable and dischargeable capacity and the information on the charging and discharging efficiency of the charging and discharging apparatus. The CPU 301 transmits the information acquired in S106 to the aggregator 102 in S107 and terminates the process of FIG. 5.

In the above example in FIG. 5, the information on the corrected chargeable and dischargeable capacity and the information on the charging and discharging efficiency of the charging and discharging apparatus are transmitted to the aggregator 102 at a predetermined time every day. However, the information acquired in S106 may be accumulated as a database (DB) in the storage unit 302 and transmitted to the aggregator 102 at a certain time in S107. In this case, a statistic such as the average may be acquired from the data accumulated for a certain period, or an estimated value estimated from the trend of the accumulated data may be acquired. The acquired information may then be transmitted to the aggregator 102.

Although FIG. 9 shows only the number of years in operation as a cause of changes in the full-charge capacity, other causes may further be taken into account. For example, information on the mileage of the EV may be taken into account. The mileage information is a cumulative mileage, for example. Information on the life of the battery may be estimated from maintenance information on the EV or the date of purchase of the EV, and a change in the full-charge capacity may be determined from the estimated value.

Figure 6:
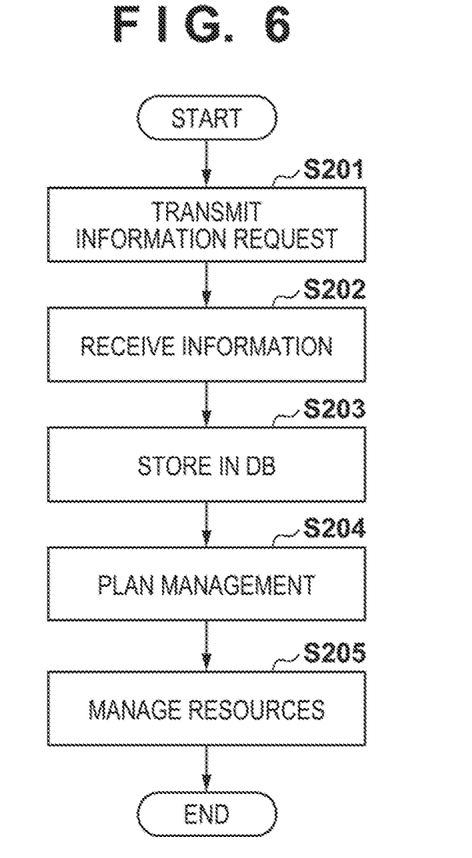
FIG. 6 is a flowchart showing a process performed when the aggregator receives the information from the consumer.

FIG. 6 is a flowchart showing a process performed when the aggregator 102 receives the data transmitted from the consumer 103. The process in FIG. 6 is implemented by, for example, the CPU 201 loading a program stored in the storage unit 202 into the memory 203 and executing the program. The process in FIG. 6 is performed periodically, for example at 17:00 every day.

In S201, the CPU 201 requests the battery data from the consumer 103. The CPU 301 of the consumer 103 receiving the request performs the process in FIG. 5. In S202, the CPU 201 receives the information transmitted from the consumer 103 in S107 in FIG. 5. The received information includes, for example, the information on the corrected chargeable and dischargeable capacity and the information on the charging and discharging efficiency of the charging and discharging apparatus owned by the consumer 103.

In S203, the CPU 201 stores, in association with the consumer 103, the information received in S202 in a DB constructed in the storage unit 202. In S204, the CPU 201 uses the information received in S202 to plan the management of the resources in the energy management system of the consumer 103. In S205, the CPU 201 manages the resources in the energy management system of the consumer 103 according to the management plan. Managing the resources here includes, for example, controlling the electric device 307, the power storage system 308, and the power generation system 309 of the consumer 103 to start or stop operation. After S205, the process in FIG. 6 terminates.

Figure 7:
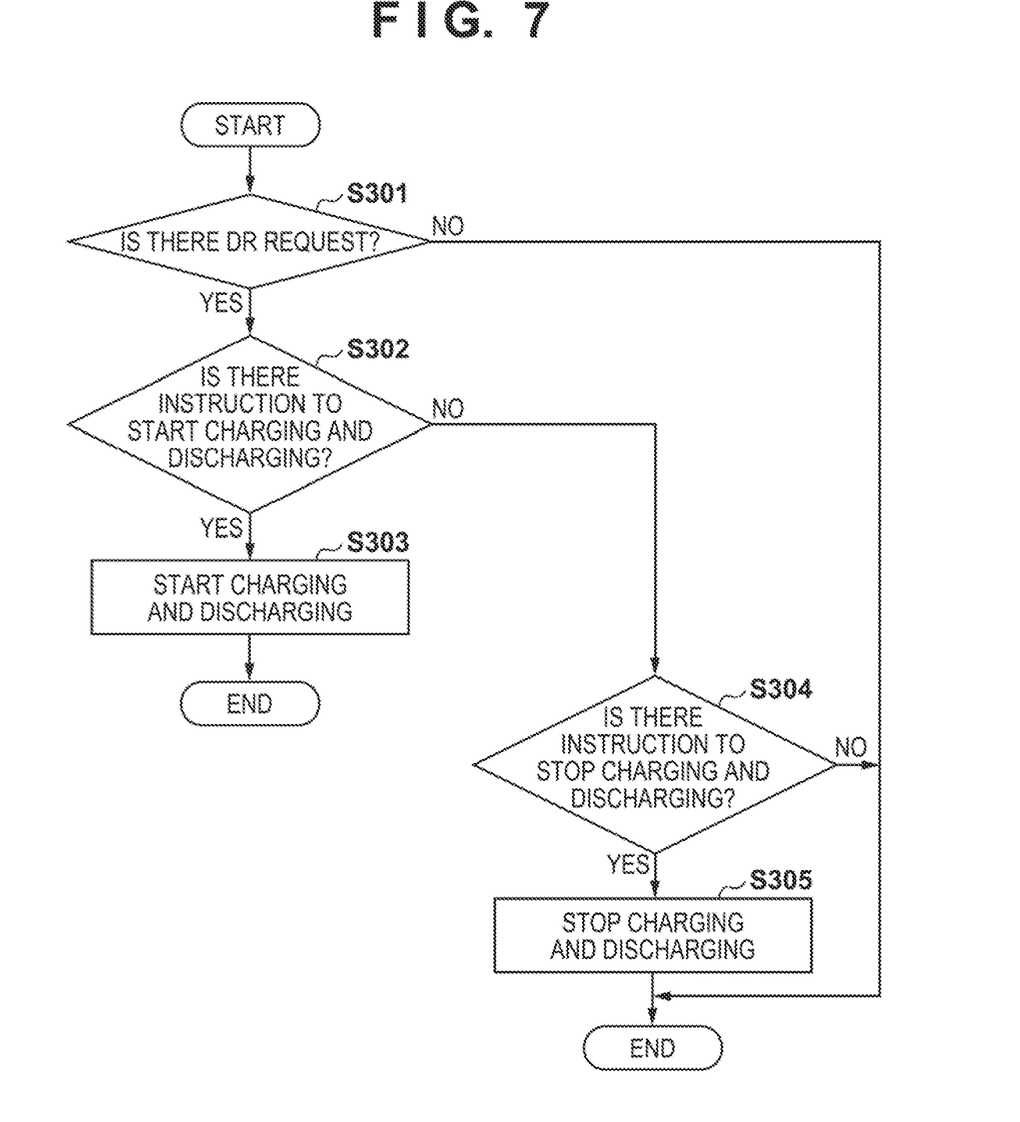
FIG. 7 is a flowchart showing a process performed when a resource management request is received from the aggregator.

FIG. 7 is a flowchart showing a process performed when a resource management request is received from the aggregator 102. The process in FIG. 7 is implemented by, for example, the CPU 301 loading a program stored in the storage unit 302 into the memory 303 and executing the program. The process in FIG. 7 starts when a request to manage the resources in the energy management system of the consumer 103 is received from the aggregator 102 in step 405 in FIG. 4.

In S301, the CPU 301 determines whether the resource management request from the aggregator 102 includes a request to manage, as a resource, the battery of the EV connected to the charging and discharging apparatus. If the CPU 301 determines that no request to manage the battery of the EV as a resource is received, the process in FIG. 7 terminates. If the CPU 301 determines that a request to manage the battery of the EV as a resource is received, the process proceeds to S302.

In S302, the CPU 301 determines whether the resource management request from the aggregator 102 instructs to start charging or discharging the battery of the EV connected to the charging and discharging apparatus. If the CPU 301 determines that the request instructs to start charging or discharging the battery, the process proceeds to S303. If the CPU 301 determines that the request does not instruct to start charging or discharging the battery, the process proceeds to S304. In S303, the CPU 301 starts, via the EMS control unit 306, the operation of charging or discharging the battery of the EV connected to the charging and discharging apparatus. After S303, the process in FIG. 7 terminates.

In S304, the CPU 301 determines whether the resource management request from the aggregator 102 instructs to stop charging or discharging the battery of the EV connected to the charging and discharging apparatus. If the CPU 301 determines that the request instructs to stop charging or discharging, the process proceeds to S305, where the CPU 301 stops the operation of charging or discharging the battery of the EV connected to the charging and discharging apparatus. After S305, the process in FIG. 7 terminates. If the CPU 301 determines that the request does not instruct to stop charging or discharging, the process in FIG. 7 terminates and a process corresponding to the DR request is performed.

Thus, according to this embodiment, characteristics of the EV and the charging and discharging apparatus can be reflected in the resource management plan to be carried out by the aggregator 102. This allows reducing the divergence between the management plan (based on, e.g., the contract between the consumer 103 and the aggregator 102) and the management performance.

In step 408 in FIG. 4, the aggregator 102 may be able to determine whether the divergence between the management plan and the management performance is due to the failure of the consumer 103 to follow the management plan or due to EV or apparatus characteristics. The failure of the consumer 103 to follow the management plan refers to, for example, the case in which the consumer 103 did not connect the EV to the charging and discharging apparatus as instructed by the plan. For example, if the divergence (difference) between the management plan and the management performance is greater than a threshold, the aggregator 102 determines that the divergence is due to the failure to follow the management plan and sets a reward that penalizes the consumer 103. If the divergence is not greater than the threshold, the aggregator 102 determines that the divergence is due to EV or apparatus characteristics, and avoids setting a reward that penalizes the consumer 103. In this manner, the consumer 103 can be prevented from being penalized with the reward for a divergence from the plan due to EV or apparatus characteristics, which the consumer 103 cannot easily recognize.

In the above embodiment, the chargeable and dischargeable capacity of the in-vehicle battery has been described as the EV characteristic data. However, instead of the battery data on the in-vehicle battery, other types of battery data may be used, such as battery data on a power storage system or a power generation system. For example, not the EV battery data but battery data on a storage battery of a solar panel may be used. Battery data on a portable storage battery may also be used. In the above embodiment, the charging and discharging efficiency has been described as the apparatus characteristic data. Although the charging and discharging efficiency described above varies with the power load, the charging and discharging efficiency may also be derived by further taking environmental information into account, such as the temperature and humidity. Not only the charging and discharging efficiency but other types of information may be used for the management plan. For example, the degree of exhaustion (such as aging) of the charging and discharging apparatus may be transmitted to the aggregator 102. In this case, the degree of exhaustion may be derived from the various types of information described above as the resource information, or from IoT information.

Summary of Embodiment

The control apparatus in this embodiment is a control apparatus that controls an electric power device managed in a VPP system. The control apparatus includes: a first acquisition unit configured to acquire information indicating charging and discharging performance of the electric power device and environmental information on the electric power device (S104); a second acquisition unit configured to acquire information indicating a characteristic of operation of charging and discharging the electric power device (S105); a correction unit configured to correct the information indicating the charging and discharging performance of the electric power device on the basis of the environmental information (S106); and a control unit configured to control the operation of charging and discharging the electric power device according to a management plan, the management plan being based on the information indicating the charging and discharging performance corrected by the correction unit and the information indicating the characteristic of the operation of charging and discharging the electric power device (FIG. 7).

The above configuration allows the management plan to reflect the information indicating the charging and discharging performance of the electric power device corrected and the information indicating the characteristic of the operation of charging and discharging the electric power device.

The control apparatus may be capable of communicating with an external apparatus (102) that plans management of electric power devices. The control apparatus may further include a transmission unit configured to transmit, to the external apparatus, the information indicating the corrected charging and discharging performance and the information indicating the characteristic of the operation of charging and discharging the electric power device (S107). The information indicating the corrected charging and discharging performance and the information indicating the characteristic of the operation of charging and discharging the electric power device may be used for making the management plan in the external apparatus (FIG. 6).

The above configuration allows using, for the management plan in the external apparatus, the information indicating the charging and discharging performance of the electric power device corrected and the information indicating the characteristic of the operation of charging and discharging the electric power device.

The control apparatus may further include a first reception unit configured to receive, from the external apparatus, a request for the information indicating the charging and discharging performance of the electric power device (S101). If the first reception unit receives the request, the first acquisition unit may acquire the information indicating the charging and discharging performance of the electric power device and the environmental information on the electric power device.

The above configuration allows acquiring the information indicating the charging and discharging performance of the electric power device and the environmental information on the electric power device in response to a request from the external apparatus that plans management of electric power devices.

The control apparatus may further include a second reception unit configured to receive, from the external apparatus, an instruction for operation of charging and discharging the electric power device (S301). If the second reception unit receives the instruction, the control unit may control the operation of charging and discharging the electric power device.

The above configuration allows controlling the operation of charging and discharging the electric power device in response to an instruction from the external apparatus that plans management of electric power devices.

The control apparatus may further include a third acquisition unit configured to acquire a connection plan for the electric power device (S105 in FIG. 11). On the basis of the connection plan acquired by the third acquisition unit, the second acquisition unit may acquire the information indicating the characteristic of the operation of charging and discharging the electric power device.

The above configuration allows, for example, acquiring a charging and discharging efficiency corresponding to output power from an in-vehicle battery on the basis of the connection time of an electric vehicle.

The electric power device may be an electric vehicle. The information indicating the charging and discharging performance of the electric power device may include a chargeable and dischargeable capacity of an in-vehicle battery of the electric vehicle. The information indicating the charging and discharging performance of the electric power device may include a change with time in full-charge capacity of an in-vehicle battery of the electric vehicle.

The above configuration allows the chargeable and dischargeable capacity of the in-vehicle battery of the electric vehicle to be used as the information indicating the charging and discharging performance of the electric power device.

The information indicating the characteristic of the operation of charging and discharging the electric power device may include an efficiency characteristic of the operation of charging and discharging. This configuration allows the efficiency characteristic of the operation of charging and discharging to be used as the information indicating the characteristic of the operation of charging and discharging the electric power device.

The invention is not limited to the foregoing embodiment, and various variations/changes are possible within the spirit of the invention.

What is claimed is:

1. An apparatus that is configured as a consumer in a VPP system, the apparatus comprising:
a first acquisition unit configured to acquire information indicating charging and discharging performance of an electric power device and environmental information on the electric power device;

a correction unit configured to correct the information indicating the charging and discharging performance of the electric power device on the basis of the environmental information;

a second acquisition unit configured to acquire information indicating charging and discharging efficiency of a charging and discharging apparatus configured to perform the operation of charging and discharging the electric power device having the charging and discharging performance corrected by the correction unit, wherein the charging and discharging efficiency varies depending on the charging and discharging performance of the electric power device as a power load of the charging and discharging apparatus; and a control unit configured to control the charging and discharging apparatus to perform the operation of charging and discharging the electric power device according to a management plan, the management plan being based on the information indicating the charging and discharging performance corrected by the correction unit and the information indicating the charging and discharging efficiency of the charging and discharging apparatus acquired by the second acquisition unit.

2. The apparatus according to claim 1, capable of communicating with an external apparatus that plans management of electric power devices, the control apparatus further comprising a transmission unit configured to transmit, to the external apparatus, the information indicating the corrected charging and discharging performance and the information indicating the charging and discharging efficiency of the charging and discharging apparatus.

3. The apparatus according to claim 2, wherein the information indicating the corrected charging and discharging performance and the information indicating the charging and discharging efficiency of the charging and discharging apparatus are used for making the management plan in the external apparatus.

4. The apparatus according to claim 2, further comprising a first reception unit configured to receive, from the external apparatus, a request for the information indicating the charging and discharging performance of the electric power device, wherein if the first reception unit receives the request, the first acquisition unit acquires the information indicating the charging and discharging performance of the electric power device and the environmental information on the electric power device.

5. The apparatus according to claim 2, further comprising a second reception unit configured to receive, from the external apparatus, an instruction for operation of charging and discharging the electric power device, wherein if the second reception unit receives the instruction, the control unit controls the operation of charging and discharging the electric power device.

6. The apparatus according to claim 1, further comprising a third acquisition unit configured to acquire a connection plan for the electric power device, wherein on the basis of the connection plan acquired by the third acquisition unit, the second acquisition unit acquires the information indicating the charging and discharging efficiency of the charging and discharging apparatus.

7. The apparatus according to claim 1, wherein the electric power device is an electric vehicle.

8. The apparatus according to claim 7, wherein the information indicating the charging and discharging performance of the electric power device comprises a chargeable and dischargeable capacity of an in-vehicle battery of the electric vehicle.

9. The apparatus according to claim 7, wherein the information indicating the charging and discharging performance of the electric power device comprises a change with time in full-charge capacity of an in-vehicle battery of the electric vehicle.

10. A power control system comprising: an apparatus that is configured as a consumer in a VPP system; and an external apparatus capable of communicating with the apparatus, the apparatus comprising:

a first acquisition unit configured to acquire information indicating charging and discharging performance of an electric power device and environmental information on the electric power device;

a correction unit configured to correct the information indicating the charging and discharging performance of the electric power device on the basis of the environmental information;

a second acquisition unit configured to acquire information indicating charging and discharging efficiency of a charging and discharging apparatus configured to perform the operation of charging and discharging the electric power device having the charging and discharging performance corrected by the correction unit, wherein the charging and discharging efficiency varies depending on the charging and discharging performance of the electric power device as a power load of the charging and discharging apparatus; and a first transmission unit configured to transmit, to the external apparatus, the information indicating the charging and discharging performance corrected by the correction unit and the information indicating the charging and discharging efficiency of the charging and discharging apparatus, the external apparatus comprising a second transmission unit configured to transmit an instruction for operation of charging and discharging the electric power device according to a management plan, the management plan being based on the information indicating the corrected charging and discharging performance and the information indicating the charging and discharging efficiency of the charging and discharging apparatus transmitted by the first transmission unit, the apparatus further comprising a control unit configured to control the charging and discharging apparatus to perform the operation of charging and discharging the electric power device according to the instruction transmitted by the second transmission unit.

11. A control method performed in an apparatus that is configured as a consumer in a VPP system, the method comprising:

acquiring information indicating charging and discharging performance of an electric power device and environmental information on the electric power device;

correcting the information indicating the charging and discharging performance of the electric power device on the basis of the environmental information;

acquiring information indicating charging and discharging efficiency of a charging and discharging apparatus configured to perform the operation of charging and discharging the electric power device having the corrected charging and discharging performance, wherein the charging and discharging efficiency varies depending on the charging and discharging performance of the electric power device as a power load of the charging and discharging apparatus; and controlling the charging and discharging apparatus to perform the operation of charging and discharging the electric power device according to a management plan, the management plan being based on the information indicating the corrected charging and discharging performance and the information indicating the charging and discharging efficiency of the charging and discharging apparatus.

12. A non-transitory computer-readable storage medium having a program stored thereon, the program causing a computer to:

acquire information indicating charging and discharging performance of an electric power device managed in a VPP system and environmental information on the electric power device;

correct the information indicating the charging and discharging performance of the electric power device on the basis of the environmental information;

acquire information indicating charging and discharging efficiency of a charging and discharging apparatus configured to perform the operation of charging and discharging the electric power device having the corrected charging and discharging performance, wherein the charging and discharging efficiency varies depending on the charging and discharging performance of the electric power device as a power load of the charging and discharging apparatus; and control the operation of the charging and discharging apparatus to perform charging and discharging the electric power device according to a management plan, the management plan being based on the information indicating the corrected charging and discharging performance and the information indicating the charging and discharging efficiency of the charging and discharging apparatus.

* * * * *